United States Patent [19]

Finlayson et al.

[11] Patent Number: 5,063,076
[45] Date of Patent: Nov. 5, 1991

[54] MULTIFUNCTIONAL, FAT-CONTINUOUS EMULSIONS WITH A REDUCED FAT CONTENT

[75] Inventors: Roger M. Finlayson, Farrarmere, South Africa; Harry Scharmann, Bromley, Great Britain; Leo F. Vermaas, Maassluis, Netherlands

[73] Assignee: Van den Bergh Foods Co., Division of Conopco, Inc., Lisle, Ill.

[21] Appl. No.: 595,649

[22] Filed: Oct. 2, 1990

[30] Foreign Application Priority Data

Aug. 29, 1986 [GB] United Kingdom ............... 8620897

[51] Int. Cl.$^5$ .......................... A23D 3/00; A23D 5/00
[52] U.S. Cl. .................................... 426/602; 426/549; 426/603; 426/604; 426/611; 426/804
[58] Field of Search ............... 426/549, 573, 602, 603, 426/604, 611, 612, 804; 260/403

[56] References Cited

U.S. PATENT DOCUMENTS

| 2,640,780 | 6/1953 | Mattikow ............................ 426/604 |
| 3,223,532 | 12/1965 | Pinkalla et al. . |
| 3,266,904 | 8/1966 | Duin et al. ........................... 426/604 |
| 3,325,291 | 6/1967 | Eikermann et al. ................. 426/612 |
| 3,661,946 | 5/1972 | Pardun ................................. 260/403 |
| 3,889,005 | 6/1975 | Brammer et al. ................... 426/585 |
| 4,103,037 | 7/1978 | Bodor et al. . |
| 4,115,598 | 9/1978 | Moran . |
| 4,229,480 | 10/1980 | Suggs et al. . |
| 4,273,795 | 6/1981 | Bosco et al. .................... 426/604 X |
| 4,315,041 | 2/1982 | Fukuda et al. . |
| 4,363,826 | 12/1982 | Fukuda et al. . |
| 4,389,426 | 6/1983 | Reissmann et al. ................. 426/602 |

FOREIGN PATENT DOCUMENTS

| 0098663 | 1/1984 | European Pat. Off. . |
| 0139398 | 5/1985 | European Pat. Off. . |
| 0141442 | 5/1985 | European Pat. Off. . |
| 0253429 | 1/1988 | European Pat. Off. . |
| 1094268 | 12/1967 | United Kingdom . |
| 1113241 | 5/1968 | United Kingdom . |
| 1129923 | 10/1968 | United Kingdom . |
| 1444025 | 7/1976 | United Kingdom . |
| 1444140 | 7/1976 | United Kingdom . |
| 1564801 | 4/1980 | United Kingdom . |
| 2150585 | 7/1985 | United Kingdom . |

OTHER PUBLICATIONS

Research Disclosure, 84-144091/23 (5/10/84).
Research Disclosure, 84-086176/14 (3/10/84).

Primary Examiner—Donald E. Czaja
Assistant Examiner—Leslie Wood
Attorney, Agent, or Firm—Rimma Mitelman

[57] ABSTRACT

Multifunctional fat-continuous emulsions having a reduced fat content are disclosed. The emulsions comprise a fatty phase, a thickened proteinaceous aqueous phase and an emulsifier system. The emulsifier system comprises mono fatty acid esters of both saturated and unsaturated fatty acids. The emulsions are of use in the manufacture of baked goods as table spreads and as frying products.

7 Claims, No Drawings

MULTIFUNCTIONAL, FAT-CONTINUOUS EMULSIONS WITH A REDUCED FAT CONTENT

This is a continuation of Ser. No. 481,734, filed Feb. 14, 1990, now abandoned, which is a continuation of Ser. No. 333,857, filed Apr. 4, 1989, now abandoned, which is a continuation of Ser. No. 090,269, filed Aug. 27, 1987, now abandoned.

FIELD OF THE INVENTION

The present invention relates to multifunctional, fat-continuous emulsions, particularly spreads with a reduced fat content.

By "multifunctional" emulsions we mean emulsions which can be used for different purposes, e.g. baking, spreading on bread and, to a lesser extent, frying.

By reduced fat content we mean a level of fat below that of conventional margarines, which contain about 80% fat, and particularly a level of fat ranging from 40–75% and ideally from 50–70% based on the weight of the emulsion.

BACKGROUND ART

Attempts have been made to produce low-calorie emulsions containing less than 80% fat which display a good performance with regard to baking, frying and spreading. So far, these attempts have failed, since the above-mentioned product properties are difficult to reconcile with each other.

The effects of reducing the level of fat to a percentage well below 80% can be summarized as follows:

With regard to baking, one observes a decrease in air-uptake in the batter, resulting in a lower specific volume (Sv) of the baked products such as cakes.

As a result of the extra water present in the reduced-fat, w/o emulsions, the cakes become wet and soggy.

With regard to spreading, an increasing tendency of the emulsion to break and to release droplets of free moisture when spread is observed. This is usually associated with an undesirably coarse appearance of the spread emulsion.

SUMMARY OF THE INVENTION

Applicants have developed new w/o emulsions which alleviate the above drawbacks and meet the above desideratum of multifunctionality to a great extent.

The w/o emulsions according to the invention comprise:

(i) a fatty phase containing up to 75 wt. % of a fat containing at least 10% of crystallized fat within the temperature range of 15°–30° C.;

(ii) a thickened, proteinaceous, aqueous phase constituting 25–50% by weight of the total emulsion and containing a thickening agent or a gelling agent consisting of a protein or a mixture of a protein with a polysaccharide; and (iii) an emulsifier system comprising mono fatty acid esters of both saturated and unsaturated fatty acids with a polyhydroxyl alcohol selected from the group comprising glycerol, polyglycerol or a mixture of both glycerol and polyglycerol, wherein (a) the amount of unsaturated fatty acid ester ranges from 0.1–0.6 wt. %, preferably from 0.3–0.5 wt. %, (b) the amount of saturated fatty acid ester ranges from 0.1–0.4 wt. %, preferably from 0.3–0.5 wt. %, and (c) the ratio of saturated fatty acid ester to unsaturated fatty acid ester ranges from 0.2–1.8.

For the avoidance of doubt, it should be noted that the ratio of glycerol residues in the polyglycerol to the number of esterified fatty acid residues is approximately one-to-one. Thus, the formula of the polyglycerol may be represented as $(-OCH_2CHOR.CH_2-)_n$, where R is a saturated or an unsaturated fatty acid residue.

DESCRIPTION OF PREFERRED EMBODIMENTS

The gelling/thickening agent preferably consists of gelatin or of a mixture of gelatin and a milk protein such as buttermilk powder, whey powder etc.

The polysaccharides constituting the gelling/thickening agent preferably consist of natural, modified or cross-linked starches. Suitable starches are e.g. rice starch, millet starch, oat starch, buckwheat starch, yam starch, maize starch. Suitable modified starches are e.g. di-starch phosphate, di-starch adipate, acetylated di-starch adipate, hydroxypropyl di-starch phosphate and acetylated di-starch phosphate.

It is, of course, possible to add a minor amount of other polysaccharides well known in the art. It is, however, ideal to use starches in view of their compatibility with the additional ingredients used to produce baked products such as cakes.

Milk proteins can be incorporated in the aqueous phase in an amount ranging from 0.1–10 wt. %. When milk protein is used to gel the aqueous phase, amounts higher than 5% and preferably between 6 and 10%, based on the emulsion, are useful.

Gelatin is preferably used in an amount ranging from 0.5–3 wt. %.

The amount of starch to be incorporated in the emulsion preferably ranges from 0.5–3 wt. %.

In order to improve the spreading performance of the emulsions according to the invention, the use of sodium or calcium stearoyl lactylate is found to be very beneficial. Preferred w/o emulsions according to the invention contain 0.1–0.5 wt. % stearoyl lactylate, up to 3 wt. % gelatin and up to 3 wt. % starch, with the understanding that increasing amounts of gelatin reduce the required amounts of starch and lactylate.

The preferred ratios of saturated : unsaturated fatty acid esters of glycerol and/or of polyglycerol range from 0.3:1 to 1.3:1.

The emulsifier system preferably contains a mixture of a saturated monoglyceride and an unsaturated monoglyceride having an iodine value exceeding 30 and preferably ranging from 40–120. The fatty acids of the saturated emulsifier are saturated $C_{16}$–$C_{18}$ fatty acids. The fatty acids of the at least partially unsaturated emulsifiers preferably comprise from 56–100% unsaturated $C_{16}$–$C_{18}$ fatty acids.

The fat constituting the continuous phase of the emulsion preferably contains 15–25 wt. % crystallized fat at the temperature at which creaming is allowed to take place in the preparation of baked goods such as cakes. The creaming temperature generally lies between 15° and 30° C. and in most instances at about 20° C.

Useful fat blends preferably contain less than 6% solid fat at 30° C. in order to avoid waxiness in the mouth, particularly when the emulsion is used as a spread on bread.

The fat preferably constitutes 50–70 wt. % of the emulsion.

The fat phase of the emulsion may contain a vegetable fat or a fat of animal origin including butterfat or mixtures of vegetable and animal fats. The fats can be in their natural form or be hydrogenated, interesterified or fractionated. For each particular application the most appropriate fat blends can easily be found.

Suitable fats (or fat blends) have a plastic consistency over a fairly wide range of temperatures and generally contain up to 90% and preferably up to 70% of oils liquid at 10° C. (that is, oils substantially free from crystallized fat at said temperature), the remainder consisting of fats melting within a temperature range preferably varying from about 20° C. to about 54° C. Good examples of fat blends are for instance:

| | | |
|---|---|---|
| 1. | Hydrogenated whale oil, having a melting point ranging from 44–46° C. | 20% |
| | Hydrogenated whale oil, having a melting point of 34° C. | 30% |
| | Coconut oil, having a melting point of 24° C. | 30% |
| | Soybean oil | 20% |
| 2. | Hydrogenated palm oil, having a melting point of 42° C. | 25% |
| | Palm oil, having a melting point of 37° C. | 30% |
| | Hydrogenated groundnut oil, having a melting point of 34° C. | 20% |
| | Soybean oil | 25% |
| 3. | Hydrogenated groundnut oil, having a melting point of 34° C. | 70% |
| | Coconut oil, having a melting point of 34° C. | 10% |
| | Soybean oil | 20% |
| 4. | Hydrogenated groundnut oil, having a melting point of 42° C. | 30% |
| | Coconut oil, having a melting point of 24° C. | 20% |
| | Palmkernel oil, having a melting point of 28° C. | 20% |
| | Soybean oil | 30% |
| 5. | 30% of an interesterified mixture consisting of 90% hydrogenated sunflower oil (melting point 44° C.) and 10% palm oil stearin 70% sunflower oil. | |

The w/o emulsions with a reduced fat content according to the invention display a very good performance when used for producing bakery products, particularly cakes. The main properties measured for judging the performance of emulsion are the cake volume, its softness and its crumb structure.

Another advantage of the w/o emulsions according to the invention lies in the fact that they can be used without any restriction in the conventional recipes, i.e. conventional recipes need not be adapted because of the use of an emulsion contributing to more water than usual in the batter used for producing the bakery product, for instance a cake. In other words, the emulsion can be used by the housewife or baker in the manufacture of baked goods as if it consisted of a conventional cake shortening or margarine.

Conventional home-made cakes are usually made by either first aerating the fat phase or by aerating the total cake batter and are often produced according to the "pound cake" recipe involving the use of equal parts of flour, sugar, eggs and fat or emulsion) plus some baking powder and salt. When a reduced-fat emulsion (w/o), i.e. an emulsion containing more than 20% water, is used instead of fat or margarine, a cake of poor quality was so far obtained, either because of the excess of water introduced into the formulation or because of the reduced amount of fat. This would require an adaptation of the recipe, which is a complex and unattractive proposition.

It was therefore a surprising observation that reduced-fat emulsions so far considered unsuitable fat ingredients for replacing margarine or shortening could be used for that purpose.

Where the present invention is concerned, batters for bakery products, particularly cakes, are preferably prepared by mixing the emulsions according to the invention, e.g. in a Hobart mixer, with the amount of sugar prescribed in the cake recipe to produce a cream to which subsequently eggs or an egg substitute is added while mixing is continued, followed by the prescribed amount of flour and leavening agents, such as baking powder or yeast.

It is also possible to homogenize and aerate the emulsions according to the invention together with all the ingredients of the batter in one go.

Baking is generally carried out at about 160° C. for about one hour. The quality of the cake is determined by measuring the specific volume (ml/g) according to standard procedures, e.g. by a wooden tray filled with millet seed (levelled). This tray is then partly emptied and the cake is put into it. The tray is now refilled to the brim with millet seed and levelled. The volume of remaining seed is determined by means of a measuring cylinder.

$$S.V. \text{ cake} = \frac{\text{Volume millet seed (in cylinder)}}{\text{weight of the cake}}$$

An S.V. of 2.2 or lower is considered poor.
An S.V. of 2.3–2.4 is good.
An S.V. of 2.5 or higher is very good.

The softness of the cake crumb can be assessed by measuring the compressibility under standard conditions. The higher the compressibility, the firmer the cake.

The water content of the cakes can be measured by weighing cake crumb from the center, before and after drying for 1 hour at 120° C.

The structure of the baked products can be assessed by comparison of photographs of various cake crumbs and giving a score varying from very fine (1) to very coarse (8).

The bakery products obtained according to the invention are unique in that they contain less fat and more water than is normally found in such bakery products, such as cakes.

The present invention also relates to reduced-fat spreads. Said spreads can be produced from the above-defined emulsions in a way known per se, e.g. in a Votator ® apparatus, by applying cooling and working treatments.

The production of margarines and spreads is illustrated in "Margarine" by A. J. C. Andersen and P. N. Williams, Second Revised Edition, Pergamon Press, 1965, Chapter III.

The quality of the spreads produced according to the invention was tested as follows:

A broad palette knife (25 to 30 mm in width) was used to spread about 30 g of a sample backwards and forwards on greaseproof paper. During four to six spreading actions in each direction, the thickness of the spread should be reduced to about 2 to 3 mm. The appearance of the spread can then be given a score between 1 (good/smooth) and 5 (very poor/very rough and "broken").

The multipurpose/multifunctional spreads according to the invention can also be useful products for shallow frying.

The frying behaviour is usually assessed by measuring the degree of spattering, formation of sediment and formation of a protein skin.

For achieving a reasonable frying performance the use of modified or cross-linked starches in the emulsion is very beneficial.

EXAMPLES

The invention will now be illustrated in the following examples.

In the following examples I–VIII a basic formulation was used, having the following composition:

| 60% of a fat blend consisting of: | |
|---|---|
| 38% | soybean oil, |
| 54% | of a mixture of hydrogenated rapeseed oil having a melting point ranging from 28–35° C., and |
| 8% | hydrogenated palm oil having a melting point of 44° C. |

The fat solids profile of the fat blend was:
$N_{10}=33$; $N_{20}=17$; $N_{30}=3$; $N_{35}=1$.

| | |
|---|---|
| 0.004% | beta-carotene |
| 0.2% | lecithin |
| 0.9% | sodium chloride |
| 0.2% | skim milk powder |
| 0.1% | potassium sorbate. |
| | other ingredients as indicated in the Table |
| | up to 100% water acidified with lactic acid to pH 4.7–4.9. |

Spreads were produced from the above emulsion by cooling and working treatments carried out in a Votator ® equipment as described in the "Margarine" reference mentioned above.

Cakes were produced, starting from the following cake batter formulation:

| | Parts by weight |
|---|---|
| Flour | 100 |
| Emulsion | 100 |
| Sucrose (crystal sugar) | 100 |
| Egg | 100 |
| Salt | 2 |
| Baking powder | 2 |

The cakes were prepared as follows:

The emulsion was mixed (aerated) with the sugar for 10 minutes in a Hobart mixer to obtain a cream. The eggs were added slowly to the cream while stirring, and subsequently the flour was added while stirring for about 1 minute.

Baking was performed at 160° C.

The structure of the cakes was light, with a slightly coarse crumb. The cakes were well cooked, and had good organoleptic properties. On consumption the cakes were not considered significantly drier than standard fat cake, i.e. a cake produced from 100 parts by weight of known margarine instead of 100 parts of the emulsion.

The product performance obtained with various thickening/gelling agents and emulsifiers with respect to spreading and cake specific volume is illustrated in the following Table.

In the following Table the following abbreviations are used:

| | |
|---|---|
| WMS = | waxy maize starch, a native starch which is substantially free from amylose. |
| $H_s$ = | Hymono 8903, a monoglyceride (90%) with an iodine value below 3, derived from palm oil |
| $H_u$ = | Hymono 7704, a monoglyceride (90%) with an iodine value of 105, derived from sunflower oil (88% unsaturated fatty acids, 12% saturated fatty acids). |
| $H_{u'}$ = | Hymono 4404, a monoglyceride (90%) with an iodine value of 45, derived from lard or tallow (44% saturated fatty acids, 56% unsaturated fatty acids). |
| SSL = | sodium stearoyl lactylate. |
| $PGE_1$ = | Admul PGE 1411, an unsaturated polyglycerol ester with an iodine value of 45, predominantly consisting of di-, tri- and tetraglycerol. |
| $PGE_2$ = | Admul PGE 1414, a saturated polyglycerol ester with an iodine value of 3, predominantly consisting of di, tri- and tetraglycerol. |
| Snowflake = | Snowflake type 5311, a modified corn starch such as corn distarch phosphate. |

The emulsions of Examples I–VIII, when used for shallow frying, displayed a satisfactory spattering behaviour.

TABLE

| | | | Product performance | |
|---|---|---|---|---|
| Example | Thickener | Emulsifier | Spreading | Cake SV |
| I | WMS (2.3%) | $H_s$ (0.25%) $H_u$ (0.2%) | 2 | 2.4 |
| II | WMS (2.0%) | SSL (0.2%) $H_s$ (0.25%) $H_u$ (0.2%) | 3 | 2.4 |
| III | gelatin (2.0%) | $H_s$ (0.25%) $H_u$ (0.2%) | 2 | 2.4 |
| IV | gelatin (1.0%) | SSL (0.2%) $H_s$ (0.25%) $H_u$ (0.2%) | 2 | 2.4 |
| V | gelatin (1%) | $H_s$ (0.2%) $H_{u'}$ (0.2%) | 2 | 2.4 |
| VI | Snowflake (2.2%) | SSL (0.2%) $H_s$ (0.2%) $H_u$ (0.2%) | 2 | 2.3 |
| VII | gelatin (1%) | $PGE_1$ (0.4%) $PGE_2$ (0.4%) | 2 | 2 |
| VIII | WMS (2%) | $PGE^1$ (0.4%) $PGE_2$ (0.4%) | 2 | 2 |
| Comparative Example A | — | $H_s$ (0.25%) | 4 | 2 |
| Comparative Example B | — | $H_s$ (0.25%) $H_u$ (0.2%) | 5 | 2.3 |

What is claimed is:

1. Water-in-oil emulsion comprising:
   (i) a fat-containing fatty phase having from 40 to 75 wt. % of a fat containing at least 10% of crystallized fat within the temperature range of 15°–30° C.;
   (ii) a thickened proteinaceous, aqueous phase constituting at least 25% by weight of the total water-in-oil emulsion and containing a thickening agent or a gelling agent selected from the group consisting of a protein, a polysaccharide and mixtures thereof; and
   (iii) an emulsifier system comprising mono-esters of saturated fatty acids and mono-esters of unsaturated fatty acids, said mono-esters formed from a polyhydroxyl alcohol selected from the group consisting of glycerol, polyglycerol, and mixtures thereof, wherein (a) the amount of unsaturated fatty acid ester ranges from 0.1–0.6 wt. %, (b) the amount of saturated fatty acid ester ranges from 0.1–0.4 wt. %, and (c) the ratio of saturated fatty acid ester to unsaturated fatty acid ester ranges from 0.2–1.8.

2. Water-in-oil emulsion according to claim 1, wherein the level of fat ranges from 50–70% by weight.

3. Water-in-oil emulsion according to claim 1, wherein the fat contains 15–25 wt. % crystallized fat within the temperature range of 15°–30° C.

4. Water-in-oil emulsion according to claim 1, wherein the gelling agent is gelatin.

5. Water-in-oil emulsion according to claim 1, wherein the gelling agent is selected from the group consisting of native starch, modified starch and cross-linked starch.

6. Water-in-oil emulsion according to claim 1, wherein the emulsifier system further comprises calcium or sodium stearoyl lactylate.

7. Water-in-oil emulsion according to claim 1, wherein the ratio of saturated:unsaturated fatty acid ester of the glycerol or polyglycerol ranges from 0.3:1 to 1.3:1.

* * * * *